Aug. 20, 1957
G. A. FOISY
2,803,340
CENTERING NEST FOR EXTRUSION PRESSES
Original Filed Oct. 23, 1950
3 Sheets-Sheet 3
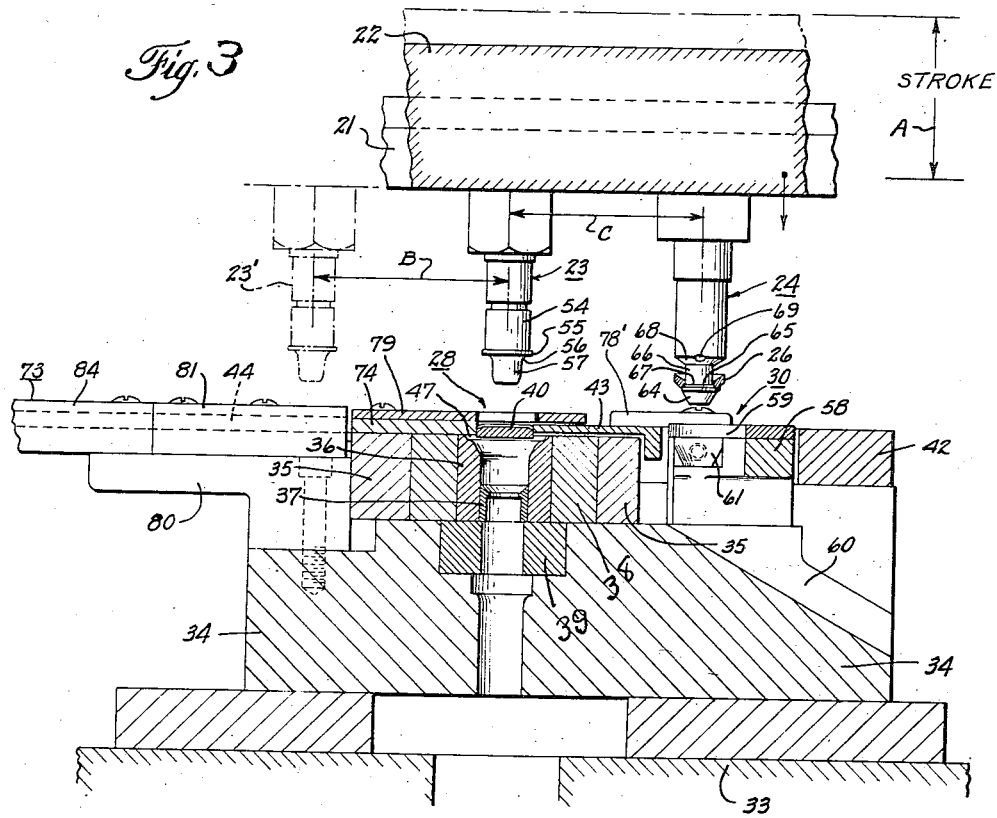
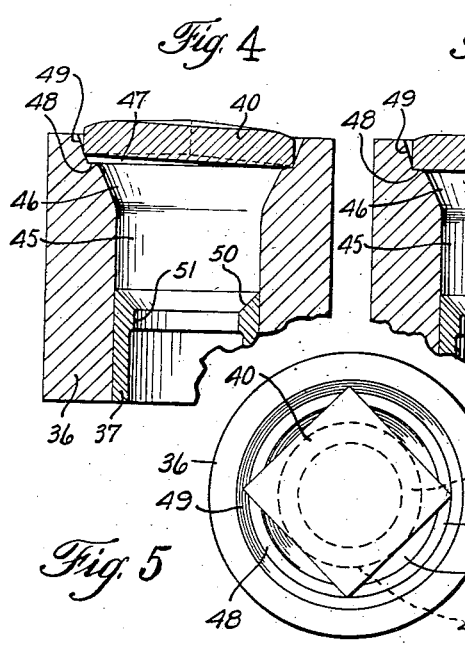
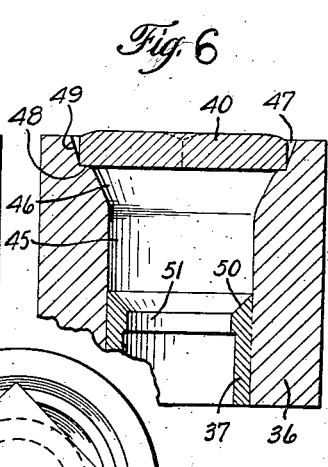
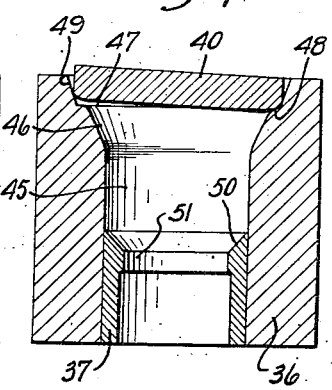
INVENTOR.
GEORGE A. FOISY
BY
Austin, Dicke, Wilhelm & Padlox
ATTORNEYS

United States Patent Office 2,803,340
Patented Aug. 20, 1957

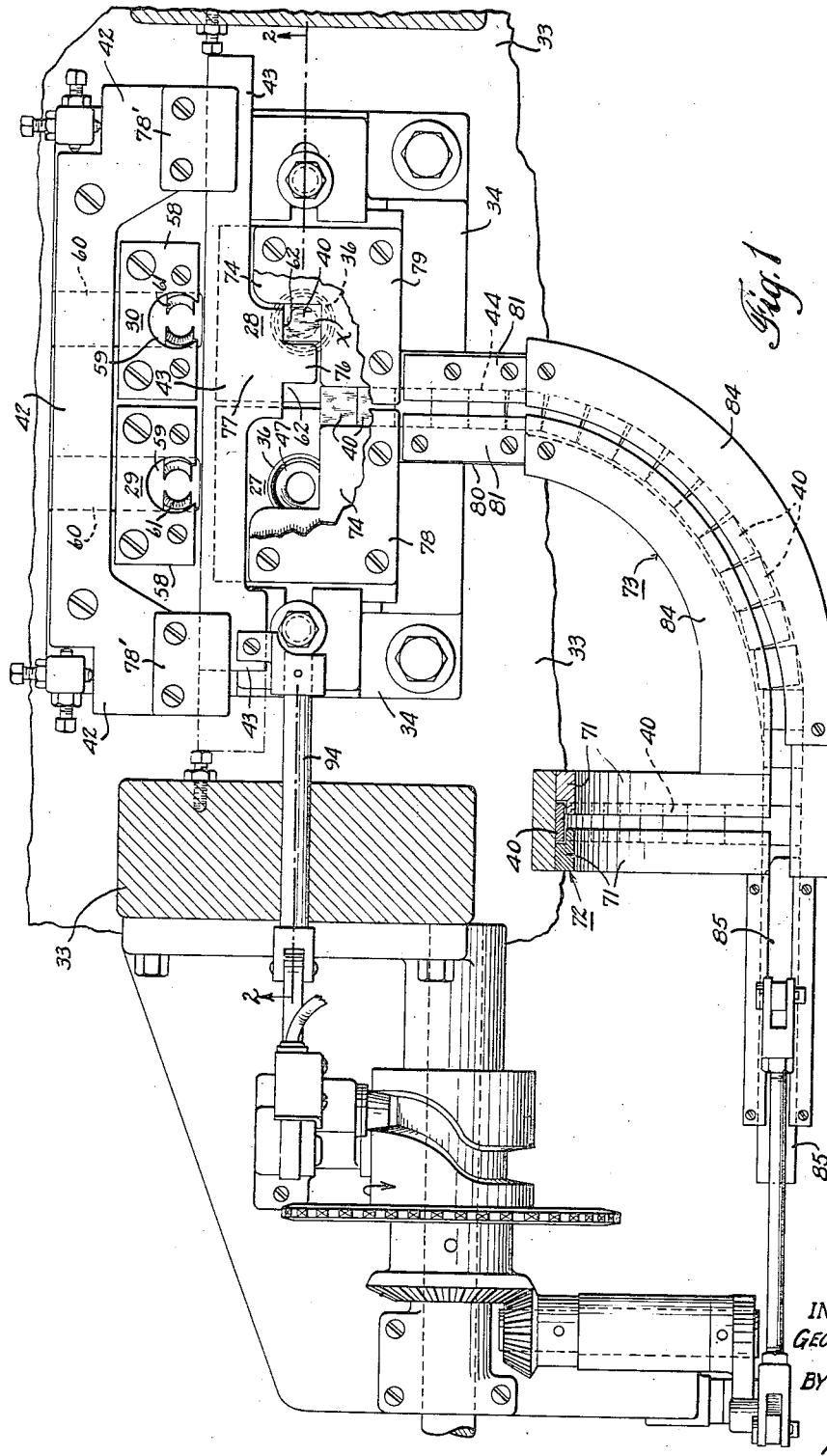

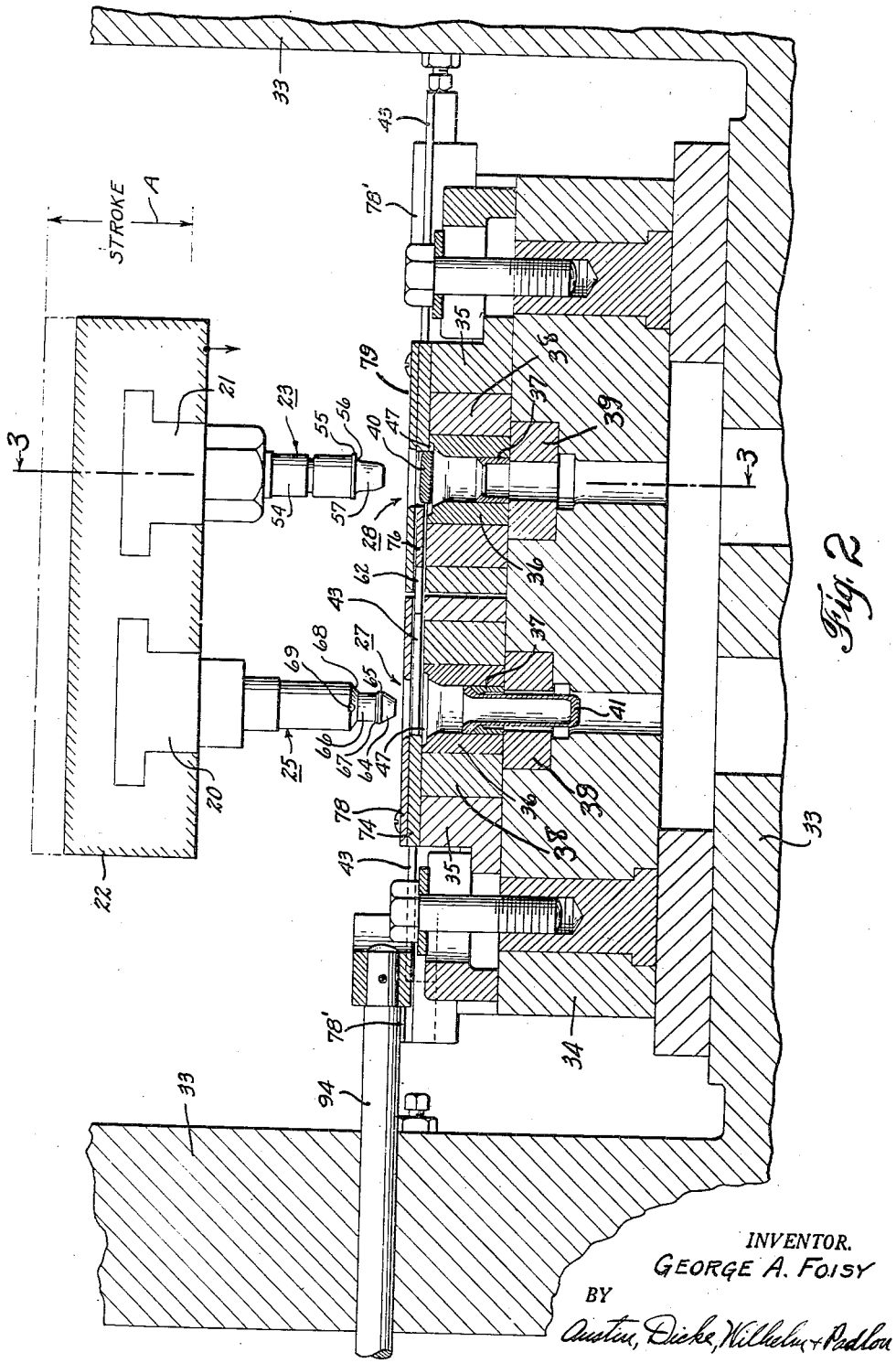

2,803,340

CENTERING NEST FOR EXTRUSION PRESSES

George A. Foisy, New Haven, Conn., assignor to Olin Mathieson Chemical Corporation, a corporation of Virginia Original application October 23, 1950, Serial No. 191,622, now Patent No. 2,673,644, dated March 30, 1954. Divided and this application March 1, 1952, Serial No. 274,453

1 Claim. (Cl. 207—6)

The invention relates to the extrusion of tubular articles, such as used in the manufacture of cartridge shells, and more particularly to a novel form of press in which the blanks may be automatically centered with respect to the extrusion apparatus, regardless of tolerance variations in the blanks.

This application is a division of application Serial No. 191,622, filed October 23, 1950, now Patent No. 2,673,644, granted March 30, 1954.

The present invention is particularly useful with extruding methods and apparatus such as disclosed in application, Serial No. 774,913, filed September 19, 1947, in the name of Emile Blair (now Patent No. 2,630,916, granted March 10, 1953), and in application, Serial No. 188,049, filed October 2, 1950, in the name of Herbert C. Childs, although not limited to such use.

The Blair application relates to the cupping and extrusion of a tubular article from a polygonal disc blank, in a single pass of the press. After the blank is extruded, it is necessary to sever the scrap ring from the tubular end product of the machine. The scrap ring is removed from the extrusion die, by a separate trimming punch on its upward stroke; the scrap ring is stripped from the trimming punch by passing the latter down into, and up out of, suitable stripping apparatus.

Important objects of the present invention are to improve the performance of extrusion presses of the type disclosed in the above-mentioned prior Blair application; to provide a centering nest arrangement for properly centering square disc blanks in the extrusion dies, regardless of variations in size of the blanks; and in general, to provide a novel form of press.

According to a preferred form of the invention, the press comprises a stationary bed or frame having right hand and left hand extrusion dies and right hand and left hand stripping assemblies directly in back of their respective extrusion dies. The press comprises a vertically reciprocable ram carrying right hand and left hand horizontal reciprocable cross heads which reciprocate from front to back of the press. Each cross head carries an extruding punch and trimming punch. Extending across the die bed is a selector cross slide having a lug with a blank-receiving recess on either side. The die bed is provided with a pathway for feeding blanks to the cross slide so that the latter can alternately deliver a blank to right hand and left hand extrusion dies. A feed pusher is also provided, which oscillates back and forth, to push a line of blanks, one by one, to the selector cross slide. A special centering nest is provided at the top of each extrusion die to properly center the blanks, regardless of difference in size of blank due to tolerance variations.

The invention also consists in certain new and original features and combinations hereinafter set forth and claimed.

Although the novel features which are believed to be characteristic of this invention will be particularly pointed out in the claim appended hereto, the invention itself, as to its objects and advantages, and the manner in which it may be carried out, may be better understood by referring to the following description taken in connection with the accompanying drawings forming a part hereof, in which:

Fig. 1 is a fragmentary plan section of a punch press, taken just above the die block assembly, illustrating the means for feeding the blanks to the die block and positioning them alternately in either one of two extrusion die positions;

Fig. 2 is a vertical section taken on the line 2—2 of Fig. 1. This view shows the left hand extrusion die containing a shell extruded on the previous stroke of the press and ready to be trimmed on the next stroke, while the right hand extrusion die contains a blank in its centering nest, ready to be cupped and extruded on the next press stroke;

Fig. 3 is a vertical section taken on the line 3—3 of Fig. 2. The extent to which the extrusion punch and trim punch shift position on alternate press strokes is indicated by dot-and-dash lines;

Fig. 4 is a vertical section through an extrusion die, showing a blank in the centering nest, as viewed on a plane passing diagonally through the square blank. The blank is a "large" blank, i. e. one near the upper tolerance limit; the view illustrates the centering action by the tapered wall of the centering nest of the die;

Fig. 5 is a plan view of Fig. 4;

Fig. 6 is a view similar to Fig. 4, but shows a blank whose size is near the lower tolerance limit; and Fig. 7 is a view similar to Fig. 4, but shows a "large" blank with its "upper," or slightly convex surface, faced downwardly, i. e. inverted with respect to the blank shown in Fig. 4.

In the following description and in the claim, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Figs. 1, 2 and 3, the extrusion press will be first only generally described.

The press comprises a stationary frame 33 (Fig. 1) on which rests a base block 34 carrying a left hand extrusion die or station 27 and left hand stripping apparatus or station 29; and also carrying right hand extrusion die or station 28 and right hand stripping apparatus or station 30.

The extrusion press also comprises a vertically reciprocable ram 22 (Fig. 2) in which is slidably mounted a left hand, horizontally reciprocable cross head 20 and a right hand horizontally reciprocable cross head 21. The right hand cross head 21 (Fig. 3) carries extrusion punch 23 and trimming punch 24. The left hand cross head 20 carries an extrusion punch (not shown) and a trimming punch 25 (Fig. 2).

The construction of the ram and of the cross heads, and of the driving devices therefor is shown somewhat diagrammatically and incomplete for purposes of simplicity; the devices for driving the ram and cross heads forms no part of the present invention, except in combination with the particular details of construction described below. Means for operating the ram and for operating the cross heads are well known.

It will be understood that the ram 22 reciprocates vertically in suitable vertical guides (not shown) partaking of a stroke indicated by the arrow A in Figs. 2 and 3. The cross head 20 and 21 reciprocate horizontally, as indicated by the arrows B and C in Fig. 3. In this figure the extrusion punch 23 is ready to descend into the extrusion die 28 to cup square blank 40 and extrude it to form tubular product 41 (Fig. 2). At the same time, the trimming punch 24, which has picked up a scrap ring 26 from a previous trimming operation, is ready to descend into the stripping apparatus 30 so as to strip off the scrap ring 26; the scrap ring thereupon falls into the chute 60 which delivers it from the machine.

On the next upstroke of the ram 22, the right hand cross head 21 shifts to the left, as indicated by the arrows B and C in Fig. 3; this brings the trimming punch 24 in line with the extrusion die 28 and the extrusion punch 23 over an idling space in front of the die, as indicated by 23' in Fig. 3. When the ram 22 descends again, the trimming punch 24 trims the extruded product in the extrusion die 28; on its upward stroke it picks up the scrap ring 26, whereupon the cross head 21 shifts back to the position shown in full lines in Fig. 3 ready for the next cycle.

It will be understood that, while right hand cross head 21 is executing the up-and-down cycle described above, the left hand cross head 20 is executing a similar but complementary up-and-down cycle. That is to say, while right hand extrusion punch 23 is entering die 28, left hand trimming punch 25 is entering extrusion die 27 (Fig. 2) and the left hand extrusion punch (not shown) is descending in an idling space in front of the die block.

Thus each extrusion punch alternately enters its extrusion die and then idles by entering its idling space in front of the die block, and each trim punch alternately enters its extrusion die and its stripping apparatus.

The blank feeding system comprises, in general, a feed slot 44 (Fig. 1) which delivers a line of square blanks 40 to the selector cross slide 43. This latter has a lug 76 forming an angular blank-receiving recess 62 on each side to receive a blank 40. It will be noted from Figure 1 that the left hand recess 62 is ready to receive a blank and that the right hand recess 62 has delivered a blank (see position X) over the right hand extrusion die 28.

The blanks are fed to the feed slot 44 from a hopper (not shown) into a vertical gravity chute 72 (Fig. 1) which intersects with a curved horizontal feed guide 73. A pusher rod 85 oscillates back and forth to push the line of blanks 40, one by one, along curved horizontal guide 73 to deliver the blanks, one by one, to the selector cross slide 43. The details of construction and operation of the pusher rod and of its drive and of the feed mechanism are described and claimed in the parent application.

As indicated particularly in Figs. 1, 2 and 3, the stationary frame 33 carries a base block 34 which in turn carries die blocks 35. The die blocks carry the extrusion rings 36 and extrusion bushings 37 of the extrusion dies 27 and 28. Reinforcing members 38 and 39 hold the extrusion rings 36 and extrusion bushings 37 in position. The base block 34 also supports stripping assemblies 29 and 30 held in place by screws (Fig. 1).

It will be understood that the particular manner of holding the stationary die parts and stripping assemblies on the base or frame of the machine form no part of the present invention as these means are well known.

The construction of the extrusion die and stripping apparatus, and of the extrusion punch and trimming punch, is disclosed in the above-mentioned Childs application. Certain features relating to the extrusion die and extrusion punch are described and claimed in the above-mentioned Blair application, and certain features relating to the trimming punch are described and claimed in the Childs application.

Referring more particularly to Figs. 2 and 3 to 7, the extrusion dies 27 and 28 will now be briefly described. Since the two dies are alike, it is only necessary to describe one.

The extrusion die comprises an extrusion ring 36 housing an extrusion bushing 37. The ring 36 has a cylindrical bore 45 merging into a flaring mouth 46. At the top of the flaring mouth is a centering nest 47 comprising an annular seat or shoulder 48 with an annular tapered side wall 49. The extrusion bushing 37 has a beveled squeeze surface 50 and an extrusion flange 51.

The extrusion punch will now be briefly described. Since the two are alike, it is only necessary to describe one. The extrusion punch 23 (Figs. 2 and 3) comprises a shank 54 having a centering flange 55 which fits into the circular bore 45 of the extrusion die. Punch 23 supports a squeeze surface 56 cooperating with squeeze surface 50 of the die and has a former or plug 57.

It will be understood that as the extrusion plunger 23 enters extrusion die 28, it first cups square blank 40 and then extrudes it into a tubular product, indicated by 41 in Fig. 2.

The trimming punches 24 and 25 are alike, and therefore, it is only necessary to describe one in detail. As shown in Figs. 2 and 3, it comprises a conical nose 64 having a shear flange 65; it has a shank recess 66 providing a slight bevel 67. It also has a swaging surface 68 provided with a plurality of overflow notches 69.

As the trimming punch 25 enters the extrusion die 27 (see Fig. 2), the shear flange 65 cooperates with the flange 51 on the die to shear off the scrap ring 26, and the swaging surface 68 squeezes the scrap ring down against the squeeze surface 50 of the die, causing the metal of the scrap ring 26 to flow over against the reduced shank 66. Any excess metal in the scrap ring flows into the overflow notches 69. This provides a more positive interlock between the scrap ring and the trimming punch 25 so that, as the trimming punch rises, it positively carries the scrap ring with it without danger of the scrap ring falling off the trimming punch prematurely. See scrap ring 26 on trimming punch 24 in Fig. 3.

The stripping devices 29 and 30 are alike, so it is only necessary to describe one. Each stripping device (Figs. 1 and 3) comprises a block 58 having an opening 59 connecting with chute 60. Mounted within opening 59 is a pair of spring pressed jaws 61. As trimming punch 24, carrying scrap ring 26 (see Fig. 3), descends into the stripping apparatus, the spring pressed jaws 61 spring into the space between scrap ring 26 and swaging shoulder 68; upward movement of the trimming punch strips the scrap ring 26 from the trimming punch, whereupon the scrap ring falls into the chute 60 where it is delivered from the machine.

The coaction of the centering nest 47 with the square blanks 40 will now be described.

Referring now to Figs. 6 to 9, the centering nest 47 is for the purpose of insuring the centering of a square (or other polygonal) disc blank 40 in the circular seat so that the extruded product will be symmetrical regardless of variations in the size of the blank due to tolerance or of the face presentation of the blank in the nest. Compare Figs. 4, 6 and 7, for example.

It will be understood that, due to tolerance variations and other causes, all of the blanks may not be exactly the same size or shape. The blanks may vary, for example, from a minimum size in which all four corners may seat snugly in the centering nest against the seat 48, as shown in Fig. 6, to a size in which the blank 40 may have certain corners at the seat 48 of the centering nest and other corners part way up the tapered side wall 49, as shown, for example, in Fig. 4.

Furthermore, while provision is made for feeding the blanks in a preedtermined position of orientation so that a flat edge thereof is always disposed in a line perpendicular to the line of travel, no provision is made for keeping the blanks with the same face presentation downward.

It will be noted particularly from Figs. 4 to 7 that the blank 40 is not completely symmetrical with respect to its top and bottom faces. Due to the punching or stamping operation which manufactures the blanks from sheet metal stock, the corners of the upper face (as shown in Fig. 6) may be swaged or drawn more than the corresponding corners of the lower face. For convenience, the blank shown in Fig. 4 will be said to have an upright presentation, while the blank shown in Fig. 7 will be said to have an inverted presentation.

It will be noted from Figs. 4 and 5 that the seat 48 of the centering nest is narrow as compared to the size of the blank; and that only the portions adjacent the corners of the square blank rest on, or above, the seat 48; and that the midpoints of the straight edges of the blank are located directly over the flare 46 of the die mouth. As pointed out in the Blair application, the use of a polygonal blank has certain important advantages in the extrusion operation, permitting cupping of the blank, and extruding it into a tubular product, in a single pass of the press.

The centering action of the centering nest 47 will now be described. It will be noted from Fig. 6 that a "minimum" size blank is completely centered above the die because it seats snugly against the seat 48 and against the bottom of tapered side wall 49. As indicated in Figs. 4, 5 and 7, a "large" blank is not completely centered above the die when it is deposited by the feeding mechanism. However, the initial engagement of the extrusion punch with the large blank acts to wedge the high corners of the blank down the tapered side wall 49 against seat 48. This action slightly compresses all four corners of the "large" blank, completely centering the blank and insuring that the extruded product will be symmetrical.

Furthermore, it will be noted the tapered side wall 49 exerts a centering action on any size blank if the blank be not fed exactly into register with the die; it is only necessary that the blank be fed to a position with all four corners above the enlarged upper end of the centering nest to insure centering. Thus, less accurate feeding action is required.

The blanks are fed from a standard feed hopper (not shown) which feeds them to the upper end of a gravity chute 72 (see Fig. 1). The gravity chute 72 has an upright portion curving into a horizontal portion which is secured to the horizontal curved guide 73. The curved guide 73 in turn is attached to an angle 80 (see Fig. 3) on the base block 34. The gravity chute 72 has recessed cover strips 71 which match recessed cover strips 84 on the horizontal curve guide 73. Feed slot 44 has recessed cover members 81 which extend the closed pathway of the curved guide 73.

The feeding devices at the die comprise spacer plates 74 which provide an extension of the feed pathway 44. The spacer plates 74 have recesses for the lug 76 which is mounted on seat 77 forming part of the selector cross slide 43. The lug 76 and the seat 77 form angular blank-receiving recesses 62 on either side of the lug 76. Cover plates 78 and 79 cover portions of the selector slide 43 and the feed pathway for the blanks. Cover plates 78 and 79 have circular holes to clear the passage of the plungers (see Fig. 2). End plates 78' secured to yoke 42 also act to hold down the selector slide 43. Selector cross slide 43 is oscillated back and forth by rod 94. The details of the drive for the selector slide are described and claimed in the parent application.

It will be understood that the cover members provide a space or pathway for the square disc blanks 40 which closely fits the blanks at the top face of the blank, at the bottom face and at the side edges. In this way the blank is prevented from tipping or skewing with respect to the line of feed and is constrained to move with its leading edge always at right angles to the line of movement of the blank.

It will be understood that, as the selector slide 43 reciprocates back and forth from left to right, the blank-receiving recess 62 on either side of the lug 76 is alternately brought into register with the feed pathway 44; thus the lug 76 alternately carries a blank into register with the right hand or left hand extrusion die. A blank, indicated by position X, is shown located over right hand extrusion die 28 in Fig. 1. The other blank-receiving recess 62 is shown ready to receive a blank in Fig. 1. Upon the next movement to the left in Fig. 1, the selector slide 43 will carry a blank to the left hand die 27.

The perpendicular relationship between the lower end of the gravity chute 72 and the end of the curved horizontal guide 73 provides a location for the feed pusher 85 (see particularly Fig. 1). Pusher 85 positively feeds the blanks 40, one by one, alternately into the blank-receiving recesses 62 of the selector cross slide 43.

Thus a machine is provided which extrudes blanks positively and automatically without interruption. The centering nest centers the square blanks in proper position for symmetrical extrusion, even though the blanks may vary somewhat in size due to tolerance variations and due to upright or inverted presentations. The centering nest also makes possible less accurate feeding of the blanks.

While certain novel features of the invention have been disclosed herein, and are pointed out in the annexed claim, it will be understood that various omissions, substitutions and changes may be made by those skilled in the art without departing from the spirit of the invention.

What is claimed is:

In an impact extrusion press, a die having a bore through which flat blanks are centered, cupped and extruded into tubes and a plunger for forcing the blanks through the bore; said die at the entrance of said bore having an annular centering nest for edgewise-compressing the corners of variable size square disc blanks and seating them in oriented position prior to cupping; said disc blanks having normal tolerance variations in size; said nest having an annular ledge providing a transverse seat to flatly engage the bottom of the blank adjacent to and around its periphery and an annular side wall rising therefrom to the entrance surface at the top of the die, the diameter of said side wall increasing from said annular seat to said entrance surface to provide a flare and the depth of said side wall measured from said annular seat to said entrance surface being substantially equivalent to the thickness of the blanks; the diameter of said nest at said seat being small enough to snugly engage all four corners of a minimum size square blank corresponding to the lower tolerance limit, the diameter of said nest near the outer end of said flaring wall at said entrance surface being large enough to receive a maximum size square blank corresponding to the upper tolerance limit, with the result that blanks will initially engage said flared side wall with their square corners and, upon downward movement of said plunger, the blank will be pushed down said flaring side wall to edgewise compress the corners of larger blanks without cupping the blank so as to center the blank and present it centered and in final oriented position on said seat; said bore having a mouth downwardly converging from said ledge seat into a cylindrical portion which will cup said blank upon further downward movement of said plunger; said bore having below said cylindrical portion an annular squeeze shoulder for extruding said cupped blank into a tube upon further downward movement of said plunger.

References Cited in the file of this patent

UNITED STATES PATENTS 189,849    Evans _____ Apr. 24, 1877

(Other references on following page)

UNITED STATES PATENTS

| | | |
|---|---|---|
| 211,323 | Ellis | Jan. 14, 1879 |
| 1,082,199 | Knaebel | Dec. 23, 1913 |
| 1,375,306 | Maisel | Apr. 19, 1921 |
| 1,689,881 | Leck | Oct. 30, 1928 |
| 1,722,634 | Kinkead | July 30, 1929 |
| 1,952,245 | Garner | Mar. 27, 1934 |
| 1,981,490 | Witte | Nov. 20, 1934 |
| 2,373,606 | Slater | Apr. 10, 1945 |
| 2,415,940 | Eckstein | Feb. 18, 1947 |
| 2,559,207 | Wnuk | July 3, 1951 |
| 2,603,987 | Lyon | July 22, 1952 |
| 2,630,916 | Blair | Mar. 10, 1953 |

FOREIGN PATENTS

| | | |
|---|---|---|
| 20,943 | Great Britain | 1899 |
| 273,058 | Germany | 1914 |